United States Patent
Craft et al.

(10) Patent No.: US 10,189,057 B2
(45) Date of Patent: Jan. 29, 2019

(54) POWDER REMOVAL ENCLOSURE FOR ADDITIVELY MANUFACTURED COMPONENTS

(71) Applicant: General Electric Company, Schenectady, NY (US)

(72) Inventors: Tiffany Muller Craft, Simpsonville, SC (US); Donnell Eugene Crear, Simpsonville, SC (US); Kassy Moy Hart, Greenville, SC (US); Archie Lee Swanner, Jr., Easley, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/205,049

(22) Filed: Jul. 8, 2016

(65) Prior Publication Data

US 2018/0009007 A1    Jan. 11, 2018

(51) Int. Cl.
*B08B 3/02*     (2006.01)
*B23K 26/70*    (2014.01)
(Continued)

(52) U.S. Cl.
CPC ............... *B08B 3/026* (2013.01); *B08B 3/12* (2013.01); *B08B 5/02* (2013.01); *B08B 7/026* (2013.01);
(Continued)

(58) Field of Classification Search
None
See application file for complete search history.

(56) References Cited

U.S. PATENT DOCUMENTS 2,246,448 A   6/1941   Mahan, Jr.
2,314,534 A   3/1943   Wind
(Continued)

FOREIGN PATENT DOCUMENTS

DE   102012002955 A1   8/2012
EP       1306148 B1    9/2006
(Continued)

OTHER PUBLICATIONS

U.S. Appl. No. 15/221,206, Office Action dated Mar. 15, 2018, 19 pages.
(Continued)

*Primary Examiner* — Jason Y Ko
*Assistant Examiner* — Cristi J Tate-Sims
(74) *Attorney, Agent, or Firm* — Ernest G. Cusick; Hoffman Warnick LLC

(57) ABSTRACT

Various embodiments of the invention include an apparatus for removing particulates from the surface of a 3D printed workpiece. Various particular embodiments include a material removal apparatus having: an enclosure having a first inlet and a first outlet; a rotatable platform contained within the enclosure for positioning a 3D printed workpiece having particulate on a surface thereof; a pressurized fluid applicator connected to the first inlet and configured to selectively apply a pressurized fluid to the 3D printed workpiece; a vibration source configured to apply an adjustable vibratory frequency to at least one of the rotatable platform or the 3D printed workpiece; and a material reclamation unit connected to the first outlet configured to collect a material removed from the 3D printed workpiece.

20 Claims, 4 Drawing Sheets

(51) Int. Cl.
  *B08B 3/12*     (2006.01)
  *B08B 5/02*     (2006.01)
  *B08B 7/02*     (2006.01)
  *B08B 7/04*     (2006.01)
  *B33Y 40/00*    (2015.01)
  *B23K 26/342*   (2014.01)

(52) U.S. Cl.
  CPC ............. *B08B 7/04* (2013.01); *B23K 26/702* (2015.10); *B23K 26/342* (2015.10); *B33Y 40/00* (2014.12)

(56) References Cited

U.S. PATENT DOCUMENTS

| | | | |
|---|---|---|---|
| 3,160,931 A | 12/1964 | Leach | |
| 3,585,258 A | 6/1971 | Levinson | |
| 3,732,048 A | 5/1973 | Guerga et al. | |
| 4,126,651 A | 11/1978 | Valentine | |
| 4,219,328 A | 8/1980 | Pasco et al. | |
| 4,278,622 A | 7/1981 | Suh | |
| 4,300,318 A * | 11/1981 | Brown | B24C 3/02 451/38 |
| 4,378,045 A | 3/1983 | Balke et al. | |
| 4,561,902 A * | 12/1985 | Lee | B08B 3/12 134/1 |
| 4,706,730 A | 11/1987 | Sanchez-Caldera et al. | |
| 4,729,804 A | 3/1988 | Dillner | |
| 4,890,662 A | 1/1990 | Sanchez-Caldera et al. | |
| 5,330,343 A | 7/1994 | Berteau | |
| 5,340,417 A | 8/1994 | Weimer et al. | |
| 5,702,501 A | 12/1997 | Osawa et al. | |
| 5,874,377 A | 2/1999 | Apteet et al. | |
| 6,197,243 B1 | 3/2001 | Tiegs et al. | |
| 6,344,635 B2 | 2/2002 | Brennan | |
| 6,390,179 B1 | 5/2002 | Yasrebi et al. | |
| 6,403,020 B1 | 6/2002 | Altoonian et al. | |
| 6,568,408 B2 * | 5/2003 | Mertens | G03F 7/423 134/144 |
| 6,808,010 B2 | 10/2004 | Dixon et al. | |
| 7,112,769 B2 | 9/2006 | Del Regno | |
| 7,287,573 B2 | 10/2007 | McNulty et al. | |
| 7,435,368 B2 | 10/2008 | Davidson et al. | |
| 7,780,905 B2 | 8/2010 | Dodds | |
| 8,794,297 B1 | 8/2014 | McNulty et al. | |
| 9,096,472 B2 | 8/2015 | Foster et al. | |
| 2002/0018877 A1 | 2/2002 | Woodall et al. | |
| 2003/0071037 A1 | 4/2003 | Sato et al. | |
| 2003/0185698 A1 | 10/2003 | Wang et al. | |
| 2004/0159985 A1 | 8/2004 | Altoonian et al. | |
| 2005/0249627 A1 | 11/2005 | Wang et al. | |
| 2008/0241404 A1 | 10/2008 | Allaman et al. | |
| 2012/0227761 A1 * | 9/2012 | Leighton | B08B 3/12 134/1 |
| 2013/0048471 A1 | 2/2013 | Capps, Jr. | |
| 2014/0251381 A1 * | 9/2014 | Markowski, III | F01D 5/005 134/21 |
| 2015/0209839 A1 * | 7/2015 | Brown | B08B 5/02 134/18 |
| 2015/0241127 A1 | 8/2015 | Sonntag et al. | |
| 2015/0266211 A1 * | 9/2015 | Wolfgang | B33Y 40/00 264/69 |
| 2016/0059270 A1 * | 3/2016 | Chen | B08B 3/02 134/111 |
| 2016/0067888 A1 | 3/2016 | Shome et al. | |
| 2016/0228929 A1 * | 8/2016 | Williamson | F01D 25/24 |
| 2016/0288420 A1 * | 10/2016 | Anderson, Jr. | B29C 67/0085 |
| 2017/0036401 A1 * | 2/2017 | Donovan | B29C 67/0096 |
| 2017/0082365 A1 | 3/2017 | Crafton et al. | |

FOREIGN PATENT DOCUMENTS

| | | | |
|---|---|---|---|
| EP | 2024168 B1 | 8/2012 | |
| JP | H11050107 A | 2/1999 | |
| JP | 2015217352 A * | 12/2015 | ............... B08B 3/02 |
| WO | 2008077224 A2 | 7/2008 | |
| WO | WO 2015177195 A1 * | 11/2015 | ........... B08B 15/026 |

OTHER PUBLICATIONS

U.S. Appl. No. 15/221,235, Office Action dated Mar. 21, 2018, 28 pages.

U.S. Appl. No. 15/221,206, Final Office Action dated Jul. 30, 2018, 22 pages.

U.S. Appl. No. 15/221,235, Final Office Action dated Nov. 9, 2018, 21 pages.

* cited by examiner

POWDER REMOVAL ENCLOSURE FOR ADDITIVELY MANUFACTURED COMPONENTS

FIELD OF THE INVENTION

The disclosure relates generally to additive manufacturing, and more particularly, to an apparatus and method for removing residual material from an additively manufactured object.

BACKGROUND OF THE INVENTION

Additive manufacturing (AM) includes a wide variety of processes of producing an object through the successive layering of material rather than the removal of material. As such, additive manufacturing can create complex geometries without the use of any sort of tools, molds or fixtures, and with little or no waste material. Instead of machining objects from solid billets of material, much of which is cut away and discarded, the only material used in additive manufacturing is what is required to shape the object.

In metal powder additive manufacturing techniques, such as selective laser melting (SLM) and direct metal laser melting (DMLM), metal powder layers are sequentially melted together to form the object. The process takes place in a processing chamber having a precisely controlled atmosphere of inert gas, e.g., argon or nitrogen. Once each layer is created, each two-dimensional slice of the object geometry can be fused by selectively melting the metal powder. The melting may be performed by a high powered laser such as a 100 Watt ytterbium laser to fully weld (melt) the metal powder to form a solid metal. The laser moves in the X-Y direction using scanning mirrors, and has an intensity sufficient to fully weld (melt) the metal powder to form a solid metal. The metal powder bed is lowered for each subsequent two-dimensional layer, and the process repeats until the three-dimensional object is completely formed.

In many additive manufacturing techniques, residual powder may remain on the surface of the resulting 3D object. Any residual powder must be removed prior to any subsequent heat-treatment of the object, e.g., annealing, case hardening, tempering, or precipitation hardening. Heat treating the 3D object without removing the residual powder may alter the geometry of the 3D object.

Current powder removal techniques may require manual manipulation of the 3D object. The 3D object may be large or heavy such that manual manipulation is burdensome. Current powder removal techniques may scatter the powder, into the air and onto the shop floor, resulting in lost or contaminated material. Reclamation of the material may burdensome. Respiration protection may also be required to reduce inhalation and ingestion of the removed powder material.

BRIEF DESCRIPTION OF THE INVENTION

A first aspect of the disclosure provides a material removal apparatus that includes: an enclosure that has a first inlet and a first outlet; a rotatable platform that is contained within the enclosure for positioning a 3D printed workpiece having particulate on a surface thereof; a pressurized fluid applicator that is connected to the first inlet and is configured to selectively apply a pressurized fluid to the 3D printed workpiece; a vibration source that is configured to apply an adjustable vibratory frequency to at least one of the rotatable platform or the 3D printed workpiece; and a material reclamation unit connected to the first outlet and configured to collect a material removed from the 3D printed workpiece.

A second aspect of the disclosure provides an apparatus for removing metal particulates from a surface of a 3D printed workpiece manufactured using a direct laser melting (DMLM) process that includes: an enclosure that has a first inlet, a second inlet and a first outlet; a rotatable platform contained within the enclosure for positioning the 3D printed workpiece that has the metal particulates on the surface thereof; a pressurized fluid applicator connected to the first inlet and configured to selectively apply a pressurized fluid to the 3D printed workpiece; a vacuum unit connected to the second inlet and configured to selectively apply a vacuum to the 3D printed workpiece; a vibration source configured to apply an adjustable vibratory frequency to at least one of the rotatable platform or the 3D printed workpiece; and a material reclamation unit connected to the first outlet configured to collect a material removed from the 3D printed workpiece.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
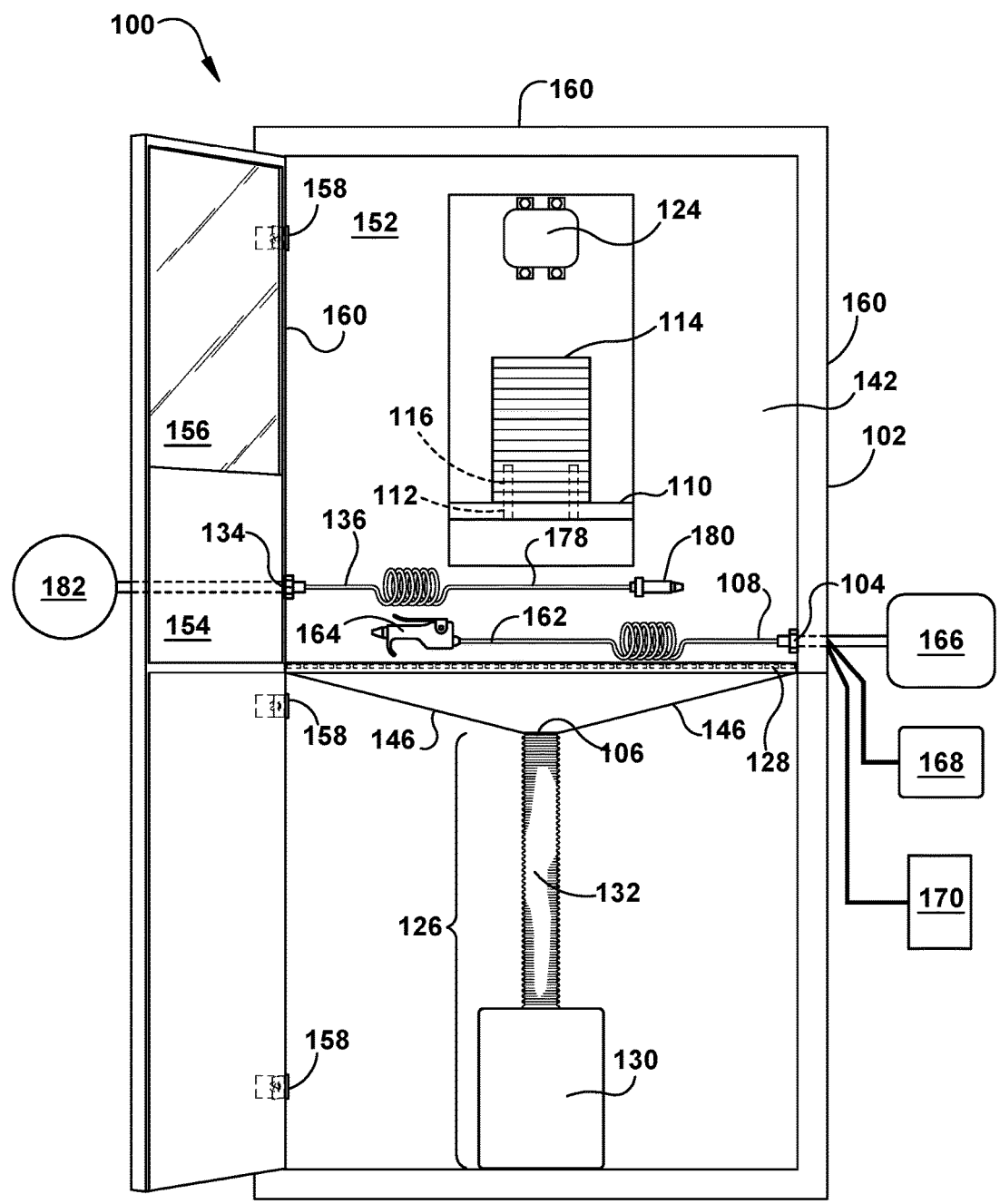
FIG. 1 shows a front view of a material removal apparatus in an open state according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

In the following specification and the claims, reference will be made to a number of terms which shall be defined to have the following meanings:

"Optional" or "optionally" means that the subsequently described event or circumstance may or may not occur, and that the description includes instances where the event occurs and where it does not. Optional features may or may not be present in the machine or apparatus itself, and the description includes instances where the feature is present and where it is not.

As indicated herein, the disclosure provides an apparatus and method for removing residual material from an additively manufactured object. As indicated, additive manufacturing (AM) may include a process of producing an object through the successive layering of material rather than the removal of material. Additive manufacturing can create complex geometries without the use of any sort of tools, molds, or fixtures, and with little or no waste material. Instead of machining objects from solid billets of metal or plastic, much of which is cut away and discarded, the only material used in additive manufacturing is what is required to shape the part. Additive manufacturing processes generally may include but are not limited to: 3D printing, rapid prototyping (RP), direct digital manufacturing (DDM), selective laser melting (SLM) and direct metal laser melting (DMLM). In terms of the current disclosure, additive manufacturing may include any process in which an object is manufactured from a powdered metal, a powdered plastic, or some other particulate. Such additive manufacturing techniques may leave residual material on the resulting 3D object. The residual material may include unused metal powder, plastic powder, or other particulate left over from the additive manufacturing process. It is emphasized that other additive manufacturing processes may present similar issues, and the teachings of the disclosure are not limited to any particular additive manufacturing process other than as stated herein.

FIG. 1 shows a material removal apparatus 100 according to an embodiment of the disclosure. Material removal apparatus 100 may be used to remove residual metal powder, plastic powder, or any other particulates from an additively manufactured object. Any residual powder must be removed prior to any subsequent heat-treatment of the object, e.g., annealing, case hardening, tempering, or precipitation hardening. Heat treating the 3D object without removing the residual powder may alter the geometry of the 3D object. Material removal apparatus 100 provides a safe means of material removal for objects (3D printed workpieces) of various geometries.

In this example, material removal apparatus 100 includes an enclosure 102. FIG. 1 shows enclosure 102 in an open state. In a closed state, a door 154 of enclosure 102 is closed such that 3D printed workpiece 114 is enclosed from all sides, isolating 3D printed workpiece 114 from the outside environment. Door 154 may be attached to a wall 160 of enclosure 102 by hinges 158 or by any other means now known or later developed to provide mobility to door 154 from an open state to a closed state. Door 154 may also include a window 156 configured to allow a user outside of enclosure 102 to view 3D printed workpiece when door 154 is in a closed state. Window 156 may include glass, acrylic, or any other transparent or translucent material now known or later developed. In an open state, door 154 is open to provide access to 3D printed workpiece 114 and an entire interior 152 of the enclosure 102. In the open state, 3D printed workpiece 114 may be movable to and from interior 152 of enclosure 102. In one embodiment, 3D printed workpiece 114 may be moved into enclosure 102 via an opening 142. Opening 142 may provide access to the entire interior 152 of enclosure 102 such as not to limit the size of 3D printed workpiece 114 acceptable by enclosure 102.

Enclosure 102 may have a plurality of inlets 104 and outlets 106. In one embodiment, enclosure 102 has one inlet (first inlet) 104 and one outlet 106. A pressurized fluid applicator 108 may be connected to first inlet 104 of enclosure 102. Pressurized fluid applicator 108 may include a pressurized fluid conduit 162 connected to first inlet 104 at one end, and a pressurized fluid nozzle 164 at the opposite end. Pressurized fluid nozzle 164 may be a nozzle, a valve, or any other means of regulating fluid flow now known or later developed. Pressurized fluid applicator 108 may be configured to apply a pressurized fluid to a 3D printed workpiece 114. Pressurized fluid applicator 108 may be supplied by a pressurized fluid source 166. Pressurized fluid source 166 may include a source of air, nitrogen, water, or any other fluid suitable to assist in material removal when applied to 3D printed workpiece 114. In one embodiment, pressurized fluid source 166 includes a source of compressed air. Application of compressed air may assist in material removal from 3D printed workpiece 114 by creating turbulent flow near a surface of 3D printed workpiece 114 and applying a force to the surface of 3D printed workpiece 114. Pressurized fluid applicator 108 may be positionable across the entire enclosure 102 in any direction. Pressurized fluid conduit 162 may be flexible such that it may extend in any direction, e.g., plastic hose. In one embodiment, pressurized fluid conduit 162 may include a compressed fluid hose.

Pressurized fluid nozzle 164 may be manually operable, remotely operable, or autonomously operable. In one embodiment, pressurized fluid nozzle 164 is autonomous and programmable to pulse at a desired frequency. The optimum pulse frequency may be dependent on the geometry of 3D printed workpiece 114. In one embodiment, pressurized fluid nozzle 164 is controlled by a programmable logic controller (PLC) 168. PLC 168 may be connected to pressurized fluid nozzle 164 or first inlet 104 such that a signal provided by PLC 168 may automatically regulate the fluid flow from pressurized fluid nozzle 164. In one embodiment, pressurized fluid applicator 108 is robotically controlled by a push-button controller 170. Push-button controller 170 may be connected to pressurized fluid nozzle 164 or first inlet 104 such that a signal provided by user-operated controls of push-button controller 170 may robotically regulate the fluid flow from pressurized fluid nozzle 164 in a pattern determined by the user's input.

Figure 4:
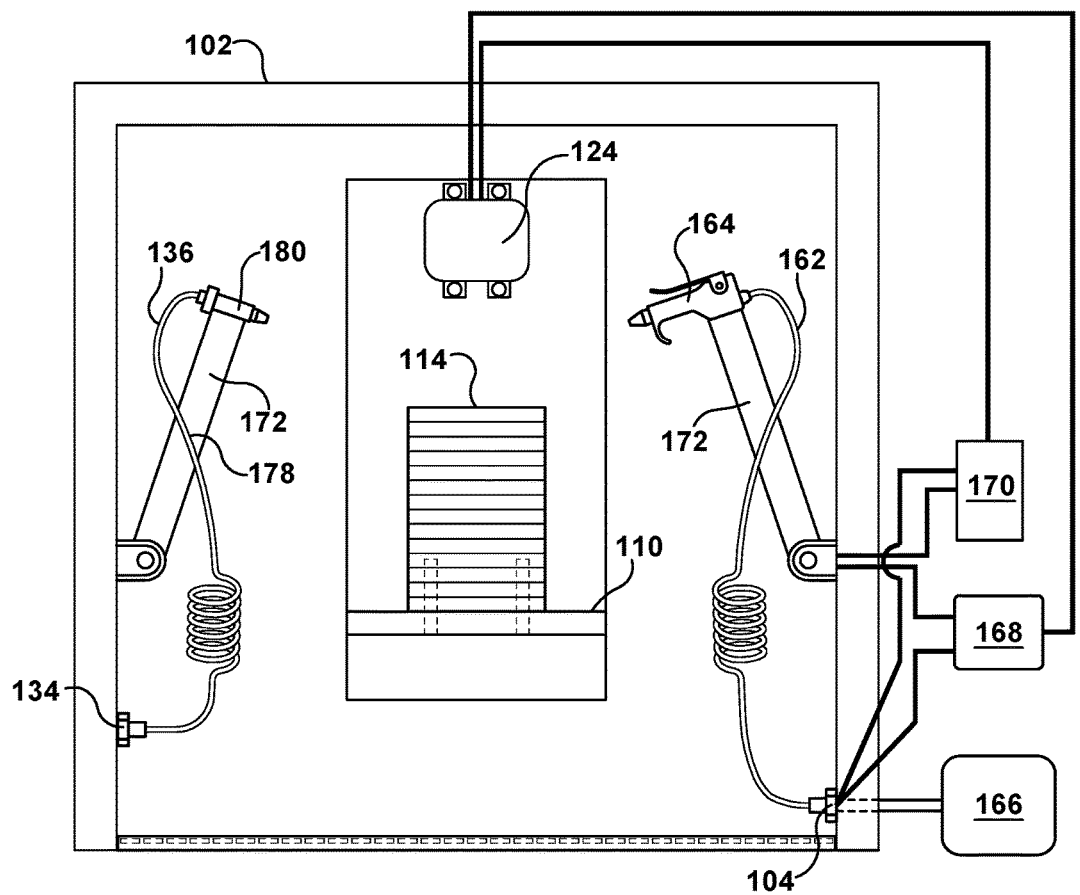
FIG. 4 shows a block diagram of a method for removing material from a 3D printed workpiece according to embodiments of the disclosure.

As shown in FIG. 4, in one embodiment, pressurized fluid applicator 108 may be attached to an autonomous articulating arm 172. Autonomous articulating arm 172 may be controlled by PLC 168. PLC 168 may be connected to autonomous articulating arm 172 such that a signal provided by PLC 168 automatically move autonomous articulating arm 172 in a pre-programmed pattern. The predetermined pattern may be determined using a geometry of 3D printed workpiece 114. In one embodiment, autonomous articulating arm 172 is robotically controlled by push button controller 170. Push-button controller 170 may be connected to autonomous articulating arm 172 such that a signal provided by user-operated controls of push-button controller 170 may robotically move autonomous articulating arm 172 in a pattern determined by the user's input. Applying a pressurized fluid to 3D printed workpiece 114 may increase mobility of the residual material on the surface of 3D printed workpiece 114 while 3D printed workpiece 114 is rotating and vibrating inside enclosure 102. Control signal connections are shown between PLC 168, push button controller 170, and one autonomous articulating arm 172 for simplicity and clarity. In one embodiment, similar control signal connections are applied to each autonomous articulating arm 172.

Returning to FIG. 1, enclosure 102 includes a rotatable platform 110 that may be rotatably fixed within enclosure 102. 3D printed workpiece 114 may be secured to rotatable platform 110 by bolts, clamps, clasps, vices, or other fastening means. In one embodiment, 3D printed workpiece 114 is fastened to rotatable platform 110 via bolts. Rotatable platform 110 may include a plurality of apertures 112. Apertures 112 may be arranged on rotatable platform 110 to coincide with a plurality of apertures 116 manufactured into 3D printed workpiece 114. In one embodiment, 3D printed workpiece 114 is fastened to rotatable platform 110 by bolts (not shown) through apertures 112 and apertures 116. Rotatable platform 110 may include multiple patterns of apertures 112 such that rotatable platform 110 may accept a variety of different 3D printed workpieces 114 with varying patterns of apertures 116.

Figure 2:
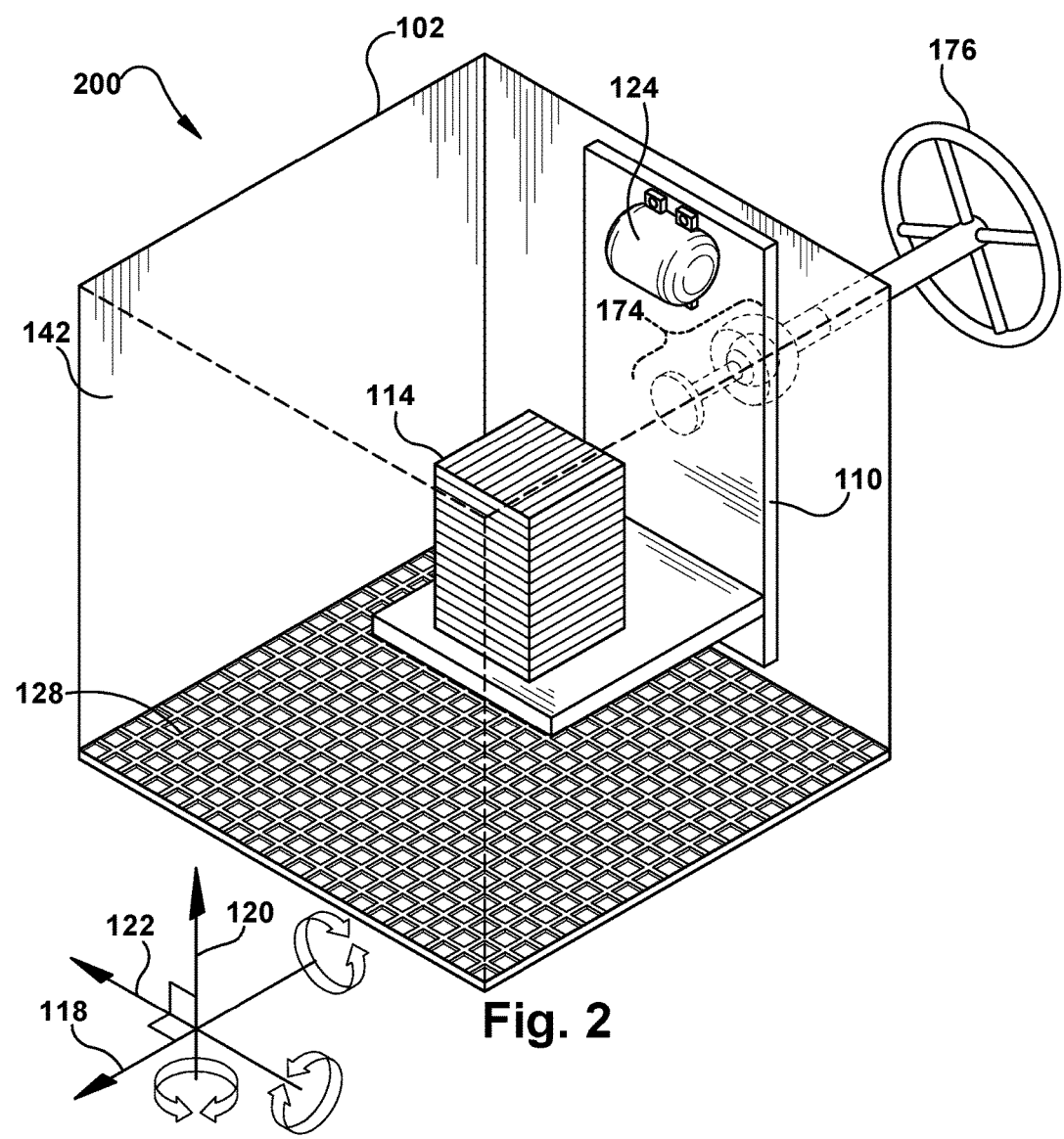
FIG. 2 shows a perspective view of a material removal apparatus according to embodiments of the disclosure.

FIG. 2 shows a material removal apparatus 200 according to an embodiment of the disclosure. In this example, rotatable platform 110 may be rotatable about at least one axis. In one embodiment, rotatable platform 110 may be rotatable about two axes. In one embodiment, rotatable platform 110 may be rotatable about three axes. Rotatable platform 110 may be able to rotate around a horizontal axis 118, a vertical axis 120, or a third axis 122. In one embodiment, third axis 122 is perpendicular to horizontal axis 118 and vertical axis 120. Rotatable platform 110 may be rotatable about a single axis only (118, 120, or 122), two axes only (118 and 120, or 118 and 122, or 120 and 122), or all three axes (118, 120, and 122). Rotatable platform 110 may be connected to enclosure 102 by a joint 174. Joint 174 may enable rotatable platform 110 to rotate about one, two, or three axes, as required by an embodiment. Joint 174 may be a universal joint, a ball and socket joint, a knuckle joint, a pin joint, or any other joint now known or later developed. In one embodiment, joint 174 includes a universal joint.

Rotatable platform 110 may be manually rotated, remotely rotated, or autonomously rotated. In one embodiment, rotatable platform 110 is manually rotated using a hand-crank wheel 176 connected to joint 174, or any other mechanical device now known or later developed. In one embodiment, rotatable platform 110 is controlled by programmable logic controller (PLC) 168. PLC 168 may be connected to joint 174 such that a signal provided by PLC 168 automatically rotates joint 174 in a pre-programmed pattern. In one embodiment, rotatable platform 110 is robotically controlled by push-button controller 170. Push-button controller may be connected to joint 174 such that a signal provided by user operated controls of push-button controller 170 may robotically rotate joint 174 separately for each axis of rotation.

A vibration source 124 may apply a vibratory frequency to 3D printed workpiece 114. Vibration source 124 may include a vibratory motor, a mechanical actuator, a hydraulic actuator, a pneumatic actuator, an acoustic frequency generator, or any means for applying a vibratory frequency to 3D printed workpiece 114 now known or later developed. In one embodiment, vibration source 124 applies a vibratory frequency directly to rotatable platform 110 that is in contact with 3D printed workpiece 114. In one embodiment, vibration source 124 is a pneumatic actuator fastened to rotatable platform 110. Vibration source 124 may be manually operable, remotely operable, or autonomously operable. In one embodiment, vibration source 124 may provide different frequencies of vibration. An optimal frequency may be a frequency that causes the highest rate of material removal from 3D printed workpiece 114. The optimal frequency may depend on the geometry of 3D printed workpiece 114. Vibration source 124 may be modulating and configured to apply a vibration pattern of changing vibratory frequency and amplitude. In one embodiment, vibration source 124 is controlled by programmable logic controller (PLC) 168. PLC 168 may be connected to vibration source 124 such that a signal provided by PLC 168 automatically changes a frequency and/or amplitude of vibration provided by vibration source 124 in a pre-programmed pattern. The predetermined pattern may be determined using a geometry of 3D printed workpiece 114. In one embodiment, vibration source 124 is robotically controlled by push button controller 170. Push-button controller 170 may be connected to vibration source 124 such that a signal provided by user-operated controls of push-button controller 170 may change a frequency and/or amplitude of vibration provided by vibration source 124 in a pattern determined by the user's input.

Returning to FIG. 1, enclosure 102 may include outlet 106. In one embodiment, outlet 106 is located in a bottom surface 146 of enclosure 102 and is fed by gravity. In one embodiment, bottom surface 146 of enclosure 102 is funnel-shaped such that outlet 106 is located at the narrow, lowest part of the bottom surface 146. In such an embodiment, the material removed from 3D printed workpiece 114 may move through outlet 106 by gravity. A vacuum or a ventilation fan (not shown) may be applied to outlet 106 in an embodiment where gravity is not sufficient to move the material removed from 3D printed workpiece 114 through outlet 106. Outlet 106 may be connected to a material reclamation unit 126 configured to collect material removed from 3D printed workpiece 114 in a collection container 130. In one embodiment, a grate 128 may be attached to enclosure 102 such that grate 128 acts as a filter for outlet 106. Grate 128 may act as a filter that prevents other objects from passing, and permits material removed from 3D printed workpiece 114 to pass, through outlet 106 to material reclamation unit 126. Grate 128 may be a perforated plate, a wire mesh, or the like, that is passable by material removed from 3D printed workpiece 114 and obstructs other objects, e.g., nuts, bolts, washers, and tools. In one embodiment, grate 128 is located in the bottom surface 146 of enclosure 102, between rotatable platform 110 and outlet 106. In one embodiment, grate 128 is located at the widest part of funnel-shaped bottom surface 146.

Collection container 130 may be located below outlet 106, fed by gravity, and optionally connected to outlet 106 via duct 132. Alternatively, collection container may be located a distance away from enclosure 102 and connected to outlet 106 via duct 132 having sufficient length to connect outlet 106 to collection container 130.

In one embodiment, enclosure 102 may include an optional second inlet 134. A vacuum unit 136 may be connected to second inlet 134 of enclosure 102. Vacuum unit 136 may include a vacuum conduit 178 connected to second inlet 134 at one end, and a vacuum nozzle 180 at the opposite end. Vacuum nozzle 180 may be a nozzle, a valve, or any other means of regulating fluid now known or later developed. Vacuum unit 136 may be configured to apply suction to 3D printed workpiece 114. Vacuum unit 136 may be connected to a vacuum source 182. Vacuum source may include a vacuum pump, or any other vacuum source now known or later developed. Applying suction in addition to a pressurized fluid to 3D printed workpiece 114 may increase a rate of material removal from 3D printed workpiece 114 compared to applying pressurized fluid alone. Vacuum unit 136 may be positionable across the entire enclosure 102 in any direction. Vacuum conduit 179 may be flexible such that it may extend in any direction, e.g., plastic hose, woven steel hose, etc. Vacuum unit 136 may be manually operable, remotely operable, or autonomously operable. In one embodiment, vacuum unit 136 is controlled by programmable logic controller (PLC) 168 similarly as described for pressurized fluid applicator 108. In one embodiment, vacuum unit 136 is controlled by push-button controller 170 similarly as described for pressurized fluid applicator 108. Vacuum unit 136 may have variable CFM (cubic feet per minute) suction, or pulsing suction. In one embodiment, material removed from 3D printed workpiece 114 by vacuum unit 136 may be disposed. In one embodiment, material removed from 3D printed workpiece 114 by vacuum unit 136 may be collected and reused. In one embodiment, material removed from 3D printed workpiece 114 may be collected in collection container 130.

Figure 3:
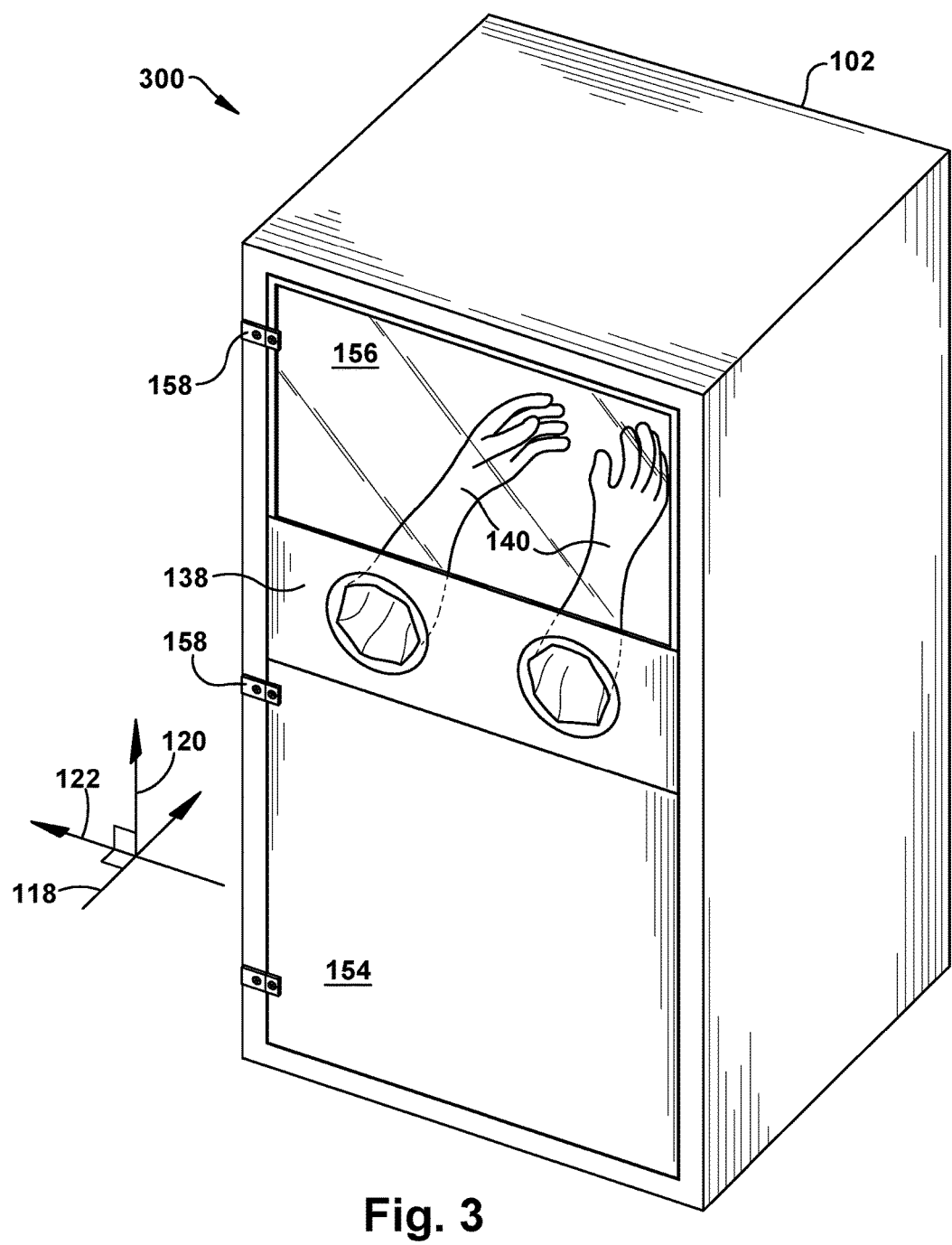
FIG. 3 shows a perspective view of a material removal apparatus in a closed state according to embodiments of the disclosure.

FIG. 3, with continued reference to FIG. 1, shows a material removal apparatus 300 according to an embodiment of the disclosure. Enclosure 102 may include a glove box 138 in door 154. Glove box 138 may include gloves 140 configured to allow a user outside enclosure 102 to manually operate pressurized fluid applicator 108 as well as optional vacuum unit 136 while 3D printed workpiece 114 is sealed inside enclosure 102. In one embodiment, gloves 140 are connected to enclosure 102 such that gloves 140 may reach pressurized fluid applicator 108, optional vacuum unit 136, 3D printed workpiece 114, and any other manually-operable tools or devices within enclosure 102. In one embodiment, gloves 140 are attached to enclosure 102 such that enclosure 102 remains sealed in a closed state.

Referring to FIGS, 1 and 2, an operation method according to the disclosure will be described. In operation, 3D printed workpiece 114 is mounted to rotatable platform 110. 3D printed workpiece 114 may be mounted to rotatable platform 110 using bolts, clamps, clasps, vices, or other fastening means. In one embodiment, 3D printed workpiece 114 is mounted to rotatable platform 110 by bolts (not shown) through apertures 112 and apertures 116.

Rotatable platform 110 is contained in enclosure 102 by closing door 154 such that interior 152 of enclosure 102 is isolated from the environment outside enclosure 102. In one embodiment, rotatable platform 110 and 3D printed workpiece 114 are sealed in enclosure 102 when enclosure 102 is in a closed state. Enclosure 102 may have a first inlet 104 and a first outlet 106. In one embodiment, pressurized fluid applicator 108 is connected to first inlet 104 such that pressurized fluid applicator is extendable across the entire interior of enclosure 102, and flexible such that is may extend in any direction.

Rotatable platform 110 may be rotated in enclosure 102 to provide access to all surfaces of 3D printed workpiece 114 for pressurized fluid applicator 108 and optional vacuum unit 136. As described, rotatable platform 110 may be manually rotated, remotely rotated, or autonomously rotated. Rotatable platform 110 may rotate about horizontal axis 118, vertical axis 120, and third axis 122, or any combination of axes 118, 120, and 122.

Pressurized fluid may be applied to 3D printed workpiece via pressurized fluid applicator 108. Pressurized fluid applicator 108 may be attached to a source of air, nitrogen, water, or any other fluid suitable to assist in material removal when applied to 3D printed workpiece 114. In one embodiment, pressurized fluid applicator 108 includes a source of compressed air. Application of compressed air may assist in material removal from 3D printed workpiece 114 by creating turbulent flow near the surface of 3D printed workpiece 114 and applying a force to the surface of 3D printed workpiece 114. As described, pressurized fluid applicator 108 may be manually operable, remotely operable, or autonomously operable. In one embodiment, pressurized fluid applicator 108 is autonomous and programmable to pulse at a desired frequency. The desired frequency may be adjustable. The optimum pulse frequency may be dependent on the geometry of 3D printed workpiece 114. In one embodiment, pressurized fluid applicator 108 is controlled by programmable logic controller (PLC) 168. In one embodiment, pressurized fluid applicator 108 is controlled by push-button controller 170. As described, in one embodiment, pressurized fluid applicator 108 may be attached to an autonomous articulating arm. Applying a pressurized fluid to 3D printed workpiece 114 may increase mobility of the residual material on the surface of 3D printed workpiece 114 while 3D printed workpiece 114 is rotating and vibrating inside enclosure 102.

A vibratory frequency may be applied to 3D printed workpiece 114 via vibration source 124. Vibration source 124 may include a vibratory motor, an actuator, an acoustic frequency generator, or any means for applying a vibratory frequency to 3D printed workpiece 114. In one embodiment, vibration source 124 applies a vibratory frequency directly to rotatable platform 110 that is in contact with 3D printed workpiece 114. In one embodiment, vibration source 124 includes a pneumatic actuator fastened to rotatable platform 110. As described, vibration source 124 may be manually operable, remotely operable, or autonomously operable. In one embodiment, vibration source 124 may provide different frequencies of vibration. An optimal frequency may be a frequency that causes the highest rate of material removal from 3D printed workpiece 114. The optimal frequency may depend on the geometry of 3D printed workpiece 114. Vibration source 124 may be modulating and configured to apply a vibration pattern of changing vibratory frequency and amplitude. In one embodiment, vibration source 124 is controlled by programmable logic controller (PLC) 168. In one embodiment, vibration source 124 is remotely controlled by push-button control 170.

Material removed from 3D printed workpiece 114 may be collected via material reclamation unit 126. In one embodiment, material reclamation unit 126 may be connected to outlet 106 located in bottom surface 146 of enclosure 102 and is fed by gravity. In one embodiment, the bottom surface 146 of enclosure 102 is funnel-shaped such that outlet 106 is located at the narrow, lowest part of the bottom surface 146. In such an embodiment, the material removed from 3D printed workpiece 114 may move through outlet 106 by gravity. A vacuum may be applied to outlet 106 in an embodiment where gravity is not sufficient to move the material removed from 3D printed workpiece 114. Outlet 106 may be connected to a material reclamation unit 126 configured to collect material removed from 3D printed workpiece 114 in a collection container 130. As described, in one embodiment, a grate 128 may be attached to enclosure 102 such that grate 128 acts as a filter for outlet 106.

A vacuum may be applied to 3D printed workpiece via vacuum unit 136. Vacuum unit 136 may be attached to a vacuum source 182. Applying a vacuum to 3D printed workpiece 114 may increase the rate of material removal from 3D printed workpiece 114 compared to applying pressurized fluid alone. As described, vacuum unit 136 may be manually operable, remotely operable, or autonomously operable. In one embodiment, vacuum unit 136 is autonomous and programmable to pulse at a desired frequency. The desired frequency may be adjustable. The optimum pulse frequency may be dependent on the geometry of 3D printed workpiece 114. In one embodiment, vacuum unit 136 is controlled by programmable logic controller (PLC) 168. In one embodiment, pressurized fluid applicator 108 is controlled by push-button controller 170. As described, in one embodiment, vacuum unit 136 may be attached to an autonomous articulating arm.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or objects, but do not preclude the presence or addition of one or more other features, integers, steps, operations, elements, objects, and/or groups thereof.

The corresponding structures, material, acts, and equivalents of all means or steps plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A material removal apparatus comprising:
an enclosure having a first inlet and a first outlet;
a rotatable platform contained within the enclosure for positioning a 3D printed workpiece having particulate on a surface thereof;
a pressurized gas applicator connected to the first inlet and configured to selectively apply a pressurized gas to the 3D printed workpiece;
a vibration source configured to apply an adjustable vibratory frequency to at least one of the rotatable platform or the 3D printed workpiece;
a material reclamation unit connected to the first outlet configured to collect a material removed from the 3D printed workpiece;
an articulating arm connected to the pressurized gas applicator configured to adjust a position of the pressurized gas applicator relative to the 3D printed workpiece; and
a programmable logic controller (PLC) configured to adjust a position and an orientation of the rotatable platform, the applying of pressurized gas from the pressurized gas applicator, the position of the articulating arm, and the adjustable vibratory frequency of the vibration source based on a physical parameter of the 3D printed workpiece, wherein the PLC:
generates a pre-programmed movement pattern based on a geometry of the 3D printed workpiece; and
adjusts the articulating arm, the rotatable platform, and the position of the pressurized gas applicator according to the pre-programmed movement pattern.

2. The material removal apparatus of claim 1, having a second inlet and a vacuum unit connected thereto for applying a vacuum to the 3D printed workpiece, wherein the PLC is communicatively connected to the vacuum unit, wherein the PLC adjusts the vacuum unit to provide a pulsing suction therefrom.

3. The material removal apparatus of claim 1, wherein the vibration source includes a mechanical actuator, and wherein the PLC: generates a pre-programmed vibration pattern having a set of frequencies and a set of amplitudes; and adjusts the mechanical actuator to apply the adjustable vibratory frequency according to the pre-programmed vibration pattern.

4. The material removal apparatus of claim 1, wherein the vibration source includes an acoustic frequency generator, and wherein the PLC: generates a pre-programmed vibration pattern having a set of frequencies and a set of amplitudes; and adjusts the mechanical actuator to apply the adjustable vibratory frequency according to the pre-programmed vibration pattern.

5. The material removal apparatus of claim 1, wherein the pressurized fluid includes compressed air.

6. The material removal apparatus of claim 1, wherein the material removed from the 3D printed workpiece includes powdered metal.

7. The material removal apparatus of claim 1, wherein the material removed from the 3D printed workpiece includes powdered plastic.

8. The material removal apparatus of claim 1, wherein the rotatable platform is rotatable on multiple axes and includes an adjustable fastener positioned within a complementary aperture of the 3D printed workpiece.

9. The material removal apparatus of claim 1, wherein the vibration source applies a pulsing vibratory frequency.

10. An apparatus for removing metal particulates from a surface of a 3D printed workpiece manufactured using a direct laser melting (DMLM) process comprising:
an enclosure having a first inlet, a second inlet and a first outlet;
a rotatable platform contained within the enclosure for positioning the 3D printed workpiece having the metal particulates on the surface thereof;
a pressurized gas applicator connected to the first inlet and configured to selectively apply a pressurized gas to the 3D printed workpiece;
a vacuum unit connected to the second inlet and configured to selectively apply a vacuum to the 3D printed workpiece;
a vibration source configured to apply an adjustable vibratory frequency to at least one of the rotatable platform or the 3D printed workpiece;
a material reclamation unit connected to the first outlet configured to collect a material removed from the 3D printed workpiece;
an articulating arm rotatably coupled to an interior of the enclosure and connected to the pressurized gas applicator, the articulating arm configured to adjust a position of the pressurized gas applicator relative to the 3D printed workpiece; and
a programmable logic controller (PLC) configured to adjust a position and an orientation of the rotatable platform, the applying of pressurized gas from the pressurized gas applicator, the position of the articulating arm, and the adjustable vibratory frequency of the vibration source based on a physical parameter of the 3D printed workpiece, wherein the PLC: generates a pre-programmed movement pattern based on a geometry of the 3D printed workpiece; and adjusts the articulating arm, the rotatable platform, and the position of the pressurized gas applicator according to the pre-programmed movement pattern.

11. The material removal apparatus of claim 1, wherein the articulating arm is rotatably coupled to an interior of the enclosure.

12. An apparatus for removing metal particulates from a surface of a 3D printed workpiece manufactured using a direct laser melting (DMLM) process, the apparatus comprising:
an enclosure having a first inlet, a second inlet and a first outlet;
a rotatable platform contained within the enclosure for positioning the 3D printed workpiece having the metal particulates on the surface thereof, wherein the rotatable platform includes an adjustable fastener positioned within a complementary aperture of the 3D printed workpiece;
a pressurized gas applicator connected to the first inlet and configured to selectively apply a pressurized gas to the 3D printed workpiece;
a vacuum unit connected to the second inlet and configured to selectively apply a vacuum. to the 3D printed workpiece;
a vibration source configured to apply an adjustable vibratory frequency to at least one of the rotatable platform or the 3D primed workpiece;
a material reclamation unit connected to the first outlet and configured to collect a material removed from the 3D printed workpiece;
an articulating arm connected to the pressurized gas applicator and configured to adjust a position of the pressurized gas applicator relative to the 3D printed workpiece; and
a programmable logic controller (PLC) configured to adjust a position and an orientation of the rotatable platform, the applying of pressurized gas from the pressurized gas applicator, the position of the articulating arm, the applying of the vacuum with the vacuum unit, and the adjustable vibratory frequency of the vibration source based on a physical parameter of the 3D printed workpiece, wherein the PLC: generates a pre-programmed movement pattern based on a geometry of the 3D printed workpiece; and adjusts the articulating arm, the rotatable platform, and the position of the pressurized gas applicator according to the pre-programmed movement pattern.

13. The apparatus of claim 12, wherein the PLC adjusts the vacuum unit to provide a pulsing suction therefrom.

14. The apparatus of claim 12, wherein the PLC: generates a pre-programmed vibration pattern having a set of frequencies and a set of amplitudes; and adjusts the vibration source to apply the adjustable vibratory frequency according to the pre-programmed vibration pattern.

15. The apparatus of claim 12, wherein the pressurized fluid includes compressed air.

16. The apparatus of claim 12, wherein the material removed from the 3D printed workpiece includes powdered metal.

17. The apparatus of claim 12, wherein the material removed from the 3D printed workpiece includes powdered plastic.

18. The apparatus of claim 12, wherein the articulating arm is rotatably coupled to an interior of the enclosure.

19. The material removal apparatus of claim 1, wherein the PLC additionally causes the pressurized gas application to apply the pressurized gas, can the vibration source to apply the adjustable vibratory frequency to, to the 3D printed workpiece at selected magnitudes while adjusting the articulating arm.

20. The apparatus of claim 12, wherein the PLC additionally causes the pressurized gas application to apply the pressurized gas, can the vibration source to apply the adjustable vibratory frequency to, to the 3D printed workpiece at selected magnitudes while adjusting the articulating arm.

* * * * *